United States Patent
Takeda et al.

(10) Patent No.: US 10,555,280 B2
(45) Date of Patent: Feb. 4, 2020

(54) USER TERMINAL, RADIO BASE STATION AND RADIO COMMUNICATION METHOD

(71) Applicant: NTT DOCOMO, INC., Tokyo (JP)

(72) Inventors: Kazuaki Takeda, Tokyo (JP); Satoshi Nagata, Tokyo (JP); Hideyuki Moroga, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/070,030

(22) PCT Filed: Jan. 12, 2017

(86) PCT No.: PCT/JP2017/000892
§ 371 (c)(1),
(2) Date: Jul. 13, 2018

(87) PCT Pub. No.: WO2017/122751
PCT Pub. Date: Jul. 20, 2017

(65) Prior Publication Data
US 2019/0029003 A1    Jan. 24, 2019

(30) Foreign Application Priority Data
Jan. 15, 2016  (JP) .................... 2016-006548

(51) Int. Cl.
*H04W 4/00* (2018.01)
*H04W 72/04* (2009.01)
*H04W 28/18* (2009.01)
*H04W 4/06* (2009.01)
*H04W 56/00* (2009.01)

(52) U.S. Cl.
CPC ............ *H04W 72/04* (2013.01); *H04W 4/06* (2013.01); *H04W 28/18* (2013.01); *H04W 56/001* (2013.01)

(58) Field of Classification Search
None
See application file for complete search history.

(56) References Cited

U.S. PATENT DOCUMENTS 8,644,240 B2    2/2014  Ishii et al.
2013/0250863 A1*   9/2013  Nogami ............... H04J 11/0069
                                          370/328

(Continued)

FOREIGN PATENT DOCUMENTS

WO    2011/021604 A1    2/2011
WO    2015/045061 A1    4/2015

OTHER PUBLICATIONS

International Search Report issued in PCT/JP2017/000892 dated Apr. 4, 2017 (1 page).

(Continued)

*Primary Examiner* — Phirin Sam
(74) *Attorney, Agent, or Firm* — Osha Liang LLP

(57) ABSTRACT

In order to realize appropriate communications in a next-generation communication system, the present invention provides a user terminal having: a reception section that receives a synchronization signal and broadcast signals; and a control section that uses the synchronization signal as a basis to specify a radio resource and/or a communication parameter of a radio access scheme used for transmission of at least one of the broadcast signals.

6 Claims, 10 Drawing Sheets

(56) References Cited

U.S. PATENT DOCUMENTS

| | | | |
|---|---|---|---|
| 2015/0156717 A1* | 6/2015 | Narasimha | H04W 52/0209 |
| | | | 370/311 |
| 2015/0189574 A1* | 7/2015 | Ng | H04W 24/08 |
| | | | 370/252 |
| 2016/0374033 A1* | 12/2016 | Nogami | H04J 11/0069 |
| 2017/0265185 A1* | 9/2017 | Fong | H04W 72/02 |
| 2018/0007673 A1* | 1/2018 | Fwu | H04W 4/70 |
| 2019/0045487 A1* | 2/2019 | You | H04L 5/0007 |
| 2019/0058572 A1* | 2/2019 | Lee | H04L 1/00 |
| 2019/0090233 A1* | 3/2019 | Fong | H04W 72/02 |
| 2019/0116079 A1* | 4/2019 | Simon | H04L 27/2613 |

OTHER PUBLICATIONS

Written Opinion of the International Searching Authority issued in PCT/JP20171000892 dated Apr. 4, 2017 (4 pages).

3GPP TS 36.300 V124.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

Extended European Search Report issued in the counterpart European Patent Application No. 17738504.4, dated Jul. 9, 2019 (8 pages).

* cited by examiner

USER TERMINAL, RADIO BASE STATION AND RADIO COMMUNICATION METHOD

TECHNICAL FIELD

The present invention relates to a user terminal, a radio base station and a radio communication method in a next-generation communication system.

BACKGROUND ART

In a UMTS (Universal Mobile Telecommunications System) network, for the purposes of achieving higher-speed data rates, providing low delay and so on, long-term evolution (LTE) has been standardized (see Non Patent Literature 1). For the purposes of achieving further broadbandization and higher speed beyond LTE (also called LTE Rel. 8 or 9), LTE-A (also called LTE advanced, LTE Rel. 10, 11 or 12) has been standardized and successor systems to LTE have been also studied a (for example, such a system is known as, FRA (Future Radio Access), 5G (5th Generation Mobile Communication System), LTE Rel. 13, Rel. 14, etc.)

In LTE Rel. 10/11, in order to achieve broadbandization, there has been introduced carrier aggregation (CA) in which a plurality of component carriers (CCs) are aggregated. Each CC corresponds one unit of the system band of LTE Rel. 8. In CA, a user terminal (UE: User Equipment) is configured with a plurality of CCs of the same radio base station (eNB: eNodeB).

On the other hand, there has been also introduced dual connectivity (DC) in which UE is configured with a plurality of cell groups (CGs) of different radio base stations. Each cell group consists of at least one cell (CC). Since a plurality of CCs of different radio base stations are aggregated in DC, DC is also called inter-eNB CA.

In addition, in LTE Rel. 8-12, there have been introduced frequency division duplex (FDD) in which downlink (DL) transmission and uplink (UL) transmission are performed using different frequency bands and time division duplex (TDD) in which DL transmission and UL transmission are performed using the same frequency band and in a time-switching manner.

CITATION LIST

Non Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

In a future radio communication system (for example, 5G), use of a broadband frequency spectrum has been considered so as to meet the demands of ultra high speeds, large capacity and ultra low delay. In addition, in a future radio communication system, it has been requested to support an environment in which a huge number of devices connect to the network simultaneously.

For example, in a future radio communication system (for example, 5G), there have been expected communication in a high frequency band in which broad band is easily available (for example, several tens GHz band) and communication of relatively small traffic used for IoT (Internet of Things), MTC (Machine Type Communication), M2M (Machine To Machine) and so on. Furthermore, there are also increasing demands for V2V (Vehicular To Vehicular) communication and D2D (Device To Device) requiring low delay communication.

In order to meet demands for various communications, it has been considered to design a new radio access scheme (New RAT (Radio Access Technology)) adapted to high frequency bands. However, if the radio communication scheme used in the existing radio communication system (for example, LTE Rel. 8-12) is to be applied as it is to New RAT, there may be problems of deterioration of the frequency usage efficiency and communication delay, which makes it difficult to perform appropriate communication.

The present invention was carried out in view of the foregoing and aims to provide a user terminal, a radio base station and a radio communication method capable of realizing appropriate communications in a next-generation communication system.

Solution to Problem

The present invention provides a user terminal comprising: a reception section that receives a synchronization signal and broadcast signals; and a control section that uses the synchronization signal as a basis to specify a radio resource and/or a communication parameter of a radio access scheme used for transmission of at least one of the broadcast signals.

Advantageous Effects of Invention

According to the present invention, it is possible to realize appropriate communication in a next-generation communication system.

DESCRIPTION OF EMBODIMENTS

As the access scheme used in future new communication systems (which may be called 5G RAT, New RAT or the like), there has been studied an extension to the access scheme used in the existing LTE/LTE-A system (also called LTE RAT, LTE-Based RAT).

In 5G RAT, a radio frame and/or a subframe configuration that is different from that of the LTE RAT may be used. For example, the radio frame configuration of 5G RAT may be different from the radio frame configuration of the existing LTE (LTE Rel. 8 through 12) in at least one of the subframe length, symbol length, subcarrier spacing, and system bandwidth.

Note that the subframe may be called transmission time interval (TTI). For example, the TTL (subframe) length in LTE Rel. 8 through 12 is 1 ms and consists of two time slots. TTI is a transmission time unit of a channel coded data packet (transport block) and is used as a processing unit of scheduling and link adaptation, etc.

More specifically, in 5G RAT, there has been decided a new radio parameter, and for example, there has been also considered a method of using a fixed number times as large as communication parameters (for example, subcarrier spacing, bandwidth, symbol length and so on) for defining the LTE radio frame (for example, N times or 1/N times), based on numerology of LTE RAT. Here, the numerology represents a set of communication parameters featuring a signal design and RAT design in a RAT. It may be possible that a plurality of numerologies may be defined and used for one RAT.

Figure 1:
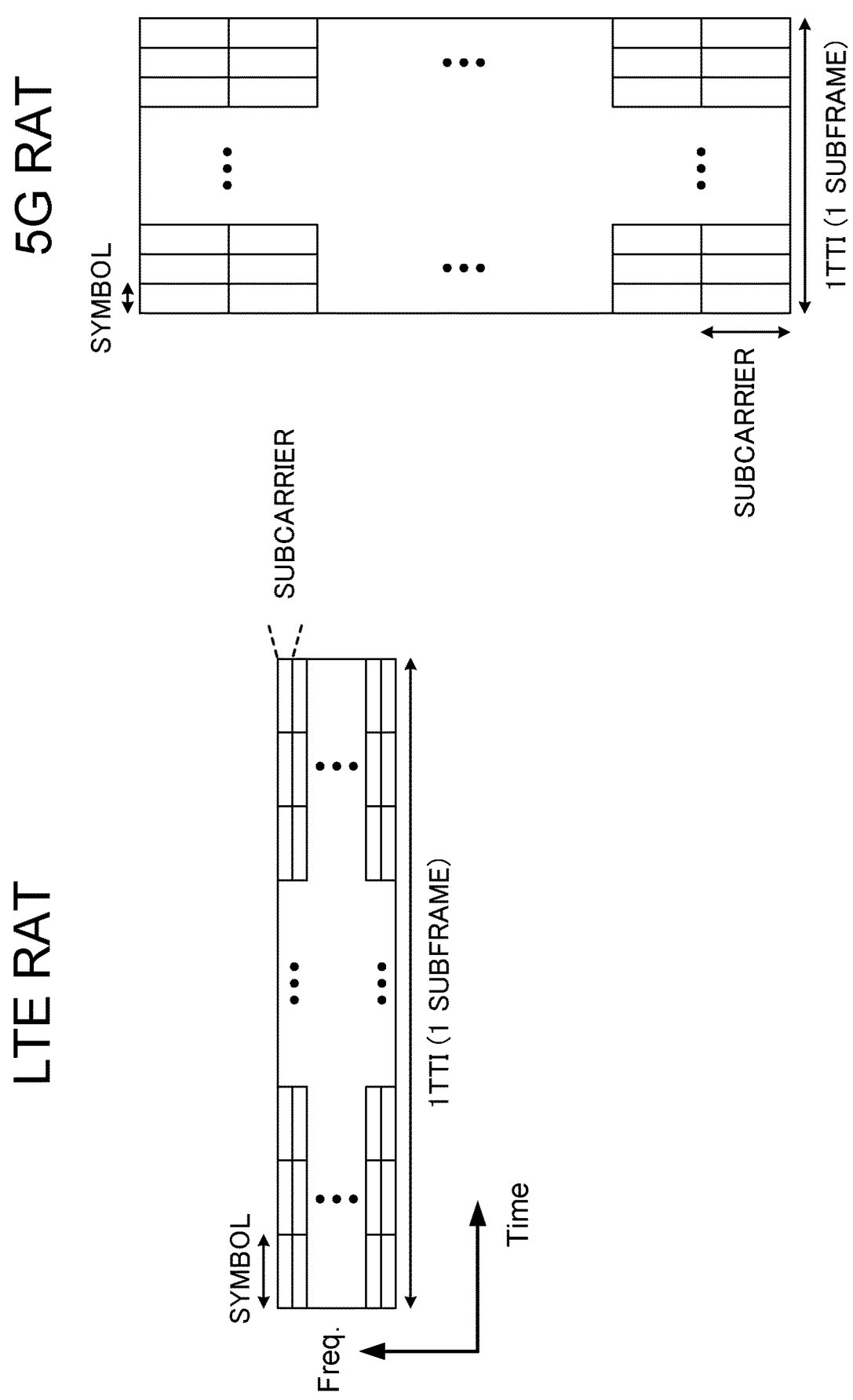
FIG. 1 is a diagram illustrating an example of LTE RAT subframe configuration and 5G RAT subframe configuration.

Further, when stating that a plurality of numerologies are different, it means that they are different at least one of the following items (1) to (6). However, the items are not limited to them.
(1) subcarrier spacing,
(2) CP (Cyclic Prefix) length,
(3) symbol length,
(4) the number of symbols per TTI
(5) TTI length
(6) filtering processing or windowing processing In 5G RAT, an extremely wide frequency (for example, 1 GHz-100 GHz) is targeted as a carrier frequency and therefore, it is considered that there are supported and coexist a plurality of numerologies that are different in symbol length, subcarrier spacing or the like depending on the required condition per use application. As an example of numerologies used in 5G RAT, it is considered that the subcarrier spacing and bandwidth is multiplied by N (for example, N>1) with reference to LTE RAT and the symbol length is multiplied by 1/N. FIG. 1 illustrates an example of the subframe configuration of 5G RAT and the subframe configuration of LTE RAT.

In FIG. 1, in LTE RAT, used is the subframe configuration of the existing LTE in which the control unit is 1 ms (14 OFDM (Orthogonal Frequency Division Multiplexing) symbol/SC-FDMA (Single-Carrier Frequency Division Multiple Access) symbol) and 180 kHz (12 subcarriers).

In FIG. 1, in 5G RAT, used is the subframe configuration (TTI configuration) in which the subcarrier spacing is greater than that of the LTE RAT and the symbol length is shorter than that of the LTE RAT. As the TTI length is shorter, it is possible to reduce the processing delay in control and shorten the delay time. Here, the TTI that is shorter than that used in LTE (for example, TTI of less than 1 ms) may be called short TTI.

According to the configuration shown in FIG. 1, as the TTI length can be shortened, it is possible to shorten the time for transmission and reception and makes it easy to realize reduction of delay. Further, as the subcarrier spacing and the system bandwidth are made greater than those of the existing LTE, it is possible to reduce the influence of phase noise in the high frequency band. With this feature, it is possible to incorporate the high frequency band where broad band is easy to secure (for example, several tens GHz band) into 5G RAT and realize high-speed communication using massive MIMO using many antenna elements.

Further, as another example of numerologies, it may be configured that the subcarrier spacing and the bandwidth are multiplied by 1/N and the symbol length is multiplied by N. With this configuration, as the entire length of symbols is increased, even if a ratio of the CP length to the symbol entire length is fixed, it is possible to elongate the CP length. With this configuration, it is possible to allow stronger (more robust) radio communications against fading in communication channels.

In 5G RAT, the control unit is not limited to existing one resource block (RB) pair (14 symbols×12 subcarriers). For example, the control unit may be a new given area unit (for example, enhanced RB: eRB) defined as a different radio resource area from the existing one RB, or it may be a unit of multiple RBs.

Here, even when different multiple numerologies are supported, it is preferable that the physical channel configuration and usage frequency are made common as far as possible.

Here, as to a cell communicating in 5G RAT, there has been studied standalone operation in which UE is able to camp on the cell alone. Here, camping on the cell means that the UE selects the cell or completes the reselection processing.

Figure 2:
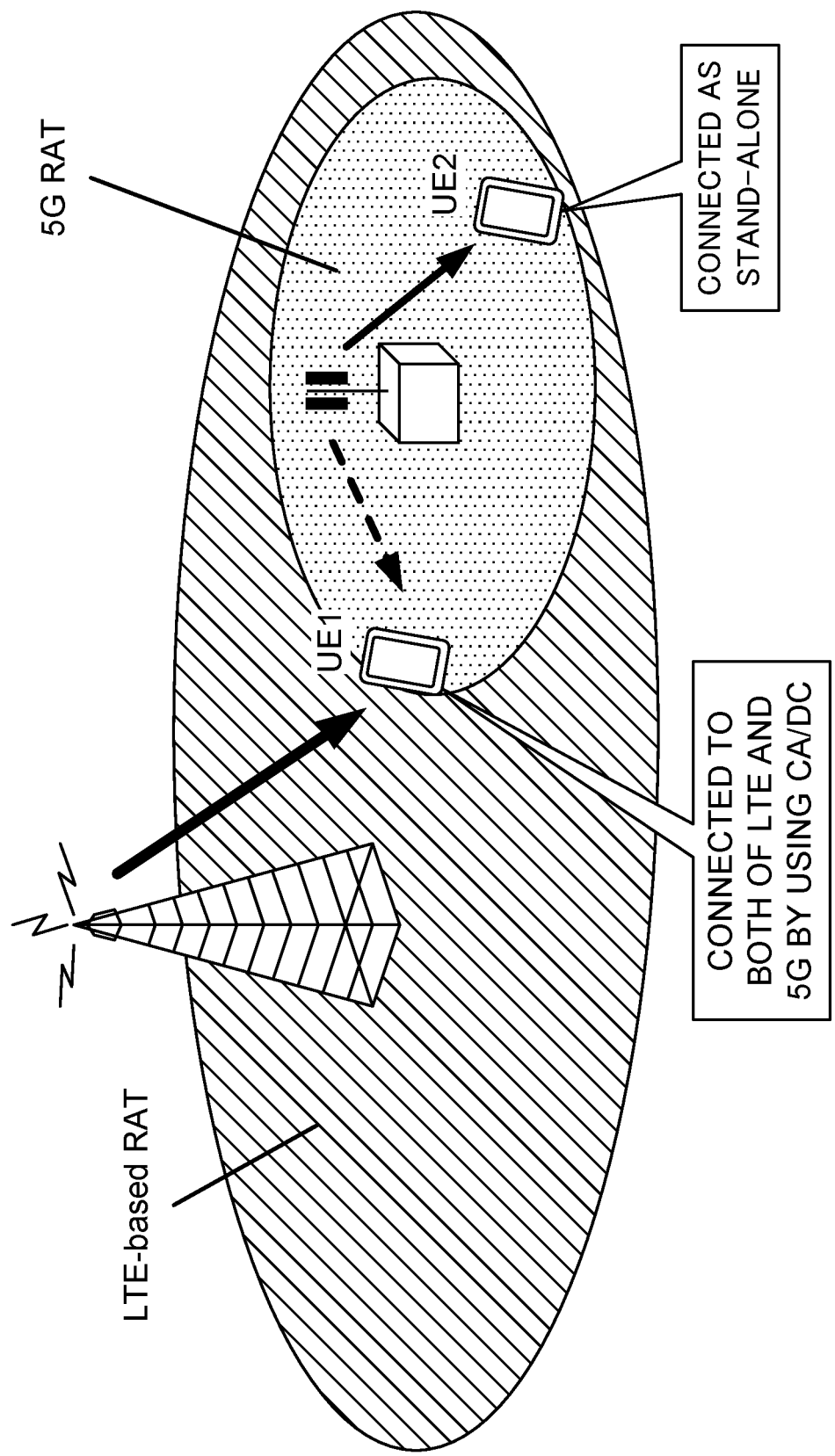
FIG. 2 is a diagram illustrating an example of UE connection using 5G RAT.

FIG. 2 is a diagram illustrating an example of the connection mode of UE using 5G RAT. In FIG. 2, an LTE-Based RAT (LTE RAT) cell and a 5G RAT cell overlie each other. In FIG. 2, the coverage of the 5G RAT cell is illustrated as being smaller than the coverage of the LTE-Based RAT cell (as a small cell), however, the size relationship between cells is not limited to this.

UE1 in FIG. 2 is located in both of cells and is expected to be connected to both of LTE RAT and 5G RAT by using CA/DC. On the other hand, UE 2 is located in both of the cells, but it is located at the cell edge of LTE RAT cell and is expected to be connected to 5G RAT by standalone.

Here, regarding the LTE RAT, for example, the numerology is defined uniquely in LTE Rel. 8-12 and UE 1 is able to detect the LTE RAT cell easily. In addition, after connecting to the LTE RAT cell, the UE 1 is able to obtain information about 5G RAT numerologies via the cell, and accordingly the UE 1 is able to be connected to the 5G RAT cell.

On the other hand, as the UE 2 is not located in the LTE RAT cell, even when the UE 2 camps on the 5G RAT cell, it is not able to be supported by the LTE RAT. However, the UE 2 does not know what numerologies (communication parameters) to use for communication in the 5G RAT cell. As to how the UE detects numerologies of the cell as a connection target, it has not been studied in the existing system.

Then, the present inventors have noted that if the UE is able to know numerologies used by NW (for example, eNB, cell) as early as possible, complexity of the system configuration is able to be suppressed preferably. Then, the present inventors have arrived at the idea of providing the UE with numerologies explicitly or implicitly by using a synchronization channel (synchronization signal) and a broadcast channel (broadcast signal).

According to an aspect of the present invention, for example, even in a standalone operation cell not supported by LTE RAT, the UE is able to know numerologies to use in the cell at the connection initial state, it is possible to suppress deterioration of the frequency usage efficiency by transmission of unnecessary signals and to reduce delay until the UE knows the numerologies, thereby enabling realization of optimal communications.

With reference to the accompanying drawings, embodiments of the present invention will be described in detail below.

In the following embodiments, a synchronization channel (synchronization signal) may be any signal used in cell search. For example, the synchronization signal may be existing primary synchronization signal (PSS), secondary synchronization signal (SSS), discovery signal (DS/DRS: Discovery Signal/Discovery Reference Signal), an extension/modified signal (for example, it may be called ePSS (enhanced PSS)/eSSS (enhanced SSS)) of any of them, a quite different signal from them, or combination of at least a part of them.

Further, the broadcast channel is a channel to transit a broadcast signal, and it may be existing broadcast channel (PBCH: Physical Broadcast Channel), extended or modified channel to the existing PBCH (for example, it may be called ePBCH (enhanced PBCH)), a quite different signal from them, or combination of at least a part of them. In the following embodiments, the synchronization is illustrated as PSS/SSS and the broadcast channel is illustrated as PBCH.

Furthermore, the broadcast signal (broadcast information) transmitted in the broadcast channel may be extended/modified information to MIB (for example, it may be called eMIB (enhanced MIB/eSIB (enhanced SIB)) or quite different information from them, or combination of at least a part of them.

Radio Communication Method

First Embodiment

In the first embodiment of the present invention, UE is configured to determine a communication parameter (numerology) used in a given radio access scheme (for example, 5G RAT) based on a synchronization channel (synchronization signal). UE can use the determined numerology in at least one of subsequent communications (for example, reception of system information block (SIB: System Information Block), PBCH (MIB), etc., transmission of PRACH (Physical Random Access Channel) and so on, transmission/reception of control information, data, reference signals and so on). That is, the UE is able to specify a numerology used in transmission of signals other than the synchronization signal and the broadcast signal as the determined numerology.

The numerology used for transmission of a synchronization signal, a resource to which the synchronization signal is allocated, a format of the synchronization signal (for example, sequence and Comb), etc. may be defined in advance in the specifications so that UE can know them in advance or UE may detect them by blind decoding.

The first embodiment is classified broadly into four modes (embodiments 1.1 through 1.4) according to the determination method. In the embodiment 1.1, the numerology is associated with a sequence (for example, scramble sequence) of a synchronization signal (for example, PSS/SSS). In this case, the UE is able to determine a numerology usable for subsequent communications (candidate numerology) from sequences of detected synchronization signals.

Note that the candidate numerology may be the same as a numerology used for transmission of a synchronization signal, or may be different therefrom. For example, if the candidate numerology is a numerology A, the numerology used for transmission of a synchronization signal may be numerology A, or numerology B or numerology C different from the numerology A.

In the embodiment 1.2, the UE blind-decodes a synchronization signal (for example, PSS/SSS) transmitted in accordance with each numerology. A plurality of synchronization signals of different numerologies to apply may be transmitted by using the same radio resource (for example, time/frequency resource) or by using different radio resources.

For example, when the candidate numerology is numerology A or numerology B, a synchronization signal of the numerology A is transmitted at the subcarrier spacing of 15 kHz and a synchronization signal of the numerology B is transmitted at the subcarrier spacing of 60 kHz by using the same radio resources as the synchronization signal of the numerology A. In this case, the UE is able to determine the numerology based on the subcarrier spacing of the detected synchronization signal.

In the embodiment 1.3, information about numerology is provided explicitly by using a synchronization signal (for example, PSS/SSS). In this case, the UE is able to obtain information about the numerology from the detected synchronization signal and to determine a numerology usable in subsequent communications based on the information.

The information about the numerology includes information about at least one of, for example, subcarrier spacing, CP length, symbol length, the number of symbols per TTI, TTI length, filtering processing and windowing processing. Here, these information pieces are associated with given indexes and if the UE knows correspondence between these information pieces and the given indexes (or formats) (for example, it is specified in advance in the standards), a given index (or a format) may be provided as the information about numerology.

For example, UE may perform time and/or frequency synchronization based on at least one of synchronization signals (for example, PSS) and obtain information about numerology based on at least one of other synchronization signals (for example, SSS). Here, synchronization signals to provide information about the numerology may include or may be associated with other information such as cell ID, operation mode (for example, NB-IoT (Narrow Band IoT) operation mode).

Here, the NB-IoT operation mode includes, for example, standalone operation (using one or more GSM (registered trademark, Global System for Mobile communications) carrier), in-band operation (using resource blocks in the existing (normal) LTE carrier), and guard band operation (using unused resource blocks in the guard band of the LTE carrier).

In the embodiment 1.4, information about numerology is provided explicitly by using PBCH. In this case, the UE is able to obtain the information about numerology by using PBCH and determine a connectable numerology (candidate numerology).

In the embodiment 1.4, the synchronization signal and PBCH may be transmitted using one same numerology. In other words, the UE is able to receive PBCH by specifying the numerology of the PBCH is the same numerology as the synchronization signal based on the synchronization signal and use the numerology, specified by the information provided by the PBCH, in subsequent communications.

Information about the numerology provided by the PBCH includes, for example, at least one of subcarrier spacing, CP length, symbol length, the number of symbols per TTI, TTI length, filtering processing and windowing processing. If these information pieces are associated with given indexes and UE knows correspondence between these information pieces and the given indexes (or formats) (for example, it is specified in advance in the standards), a given index (or a format) may be provided as the information about numerology.

According to the above-mentioned first embodiment, UE is able to use the synchronization signal to specify, for example, a numerology to apply to a broadcast signal and a numerology to apply to other than the synchronization signal/broadcast signal, it is possible to reduce delay until the numerology is recognized.

Second Embodiment

While studying the 5G, the present inventors have found another problem, which will be described specifically below.

In the radio communication scheme (communication standard) like 5G in which new specifications will be added in future, even if a signal is able to be received (detected) by UE specified in the initial specification, the signal may not be received by UE specified in the late-stage specification. For example, assume that initial specifications of the given communication standard describe X Hz (for example, X=1.4 MHz) PBCH (broadcast information) and later-stage specifications describes UE that only supports the bandwidth of the maximum Y Nz (<X Hz) (for example, Y=180 kHz). In this case, the UE is not able to receive PBCH of the initial specifications and there is a need to transmit other broadcast information of Y Hz or less for the UE.

If the specifications are thus fixed, the broadcast information needs to be always transmitted multiple times, which causes an increase of communication overhead and reduction of the frequency usage efficiency.

Thus, assuming the possibility of supporting multiple broadcast information scalable in future, the present inventors has found the idea of adopting a physical channel to provide minimum information required for reception of at least one of the multiple broadcast information and completed the second embodiment of the present invention.

In the second embodiment of the present invention, a plurality of pieces of PBCH is defined. Out of the plural pieces of PBCH, at least one is PBCH transmitted by a specific radio resource. In the following description, the PBCH is called PBCH 1, first PBCH or the like, but it may be called by any other name.

In the given radio access scheme (for example, 5G), the PBCH 1 is transmitted in a predetermined fixed radio resource (for example, fixed bandwidth and/or central frequency) that all terminals meeting the specification of the radio access scheme (including terminals meeting any future specifications) are able to receive. For example, the PBCH 1 is preferably allocated to a radio resource in the minimum allocation unit defined in the specifications of given communication standard (for example, frequency resource in the minimum allocation unit and/or time resource in the minimum allocation unit). Here, the given communication standard denotes, but is not limited to, for example, LTE Rel. 13, 14, 15 and later LTE standard or multiple standards of them (for example, LTE Rel. 13-15).

Note that PBCH 1 may be configured with a frequency resource in the minimum allocation unit and a plurality of time resources in the minimum allocation unit, or it may be configured with a plurality of frequency resources in the minimum allocation unit and a time resource in the minimum allocation unit. Otherwise, the PBCH 1 may be configured with a plurality of frequency resources in the minimum allocation unit and a plurality of time resources in the minimum allocation unit.

The resources to which the PBCH 1 is allocated may be defined in the specifications to be known to the UE in advance or it may be determined by the UE based on a synchronization signal. Determination based on a synchronization signal may be performed in the same manner as determination of numerologies as explained in the embodiments 1.1 through 1.3. For example, the resources to which the PBCH 1 is allocated (for example, frequency resource) may be associated with PSS and/or SSS sequence or may be provided explicitly by PSS and/or SSS.

Here, the numerology specified by the synchronization signal may be associated with the format (for example, coding and modulation scheme) of PBCH 1 or the resource to which the PBCH 1 is allocated. This association may be defined in the specification to be known to the UE in advance or information about this association may be provided by using a synchronization signal.

PBCH 1 is used to provide information required to receive another PBCH (following PBCH) (for example, information to specify a radio resource and information of the PBCH format). Here, the other PBCH specified by using the information transmitted by the PBCH 1 is called PBCH 2 or second PBCH, but it name is not limited to these. A plurality of PBCHs 2 may be provided. For example, two PBCHs (PBCH 2 and PBCH 3) are defined as PBCH 2 and they may be used to transmit different broadcast information pieces.

For example, the PBCH 1 may be used to provide information required to receive PBCH 2 such as information about a frequency resource of PBCH 2 (for example, information specify at least one of frequency bandwidth, transmission bandwidth and central frequency), information about a time resource of PBCH 2 (for example, information to specify at least one of time position, subframe index, symbol index, cycle, offset and so on), transport block size (TBS) of PBCH 2 and so on.

UE receives PBCH 2 based on the information provided by PBCH 1. Note that the UE may perform reception of PBCH 2 by using the same frequency resource as PBCH 1, irrespective of with or without the information about the information of the frequency resource of PBCH 2. In addition, the UE may perform reception of PBCH 2 by using the time resource adjacent to PBCH 1, irrespective of with or without information about the time resource of PBCH 2.

Figure 3B:
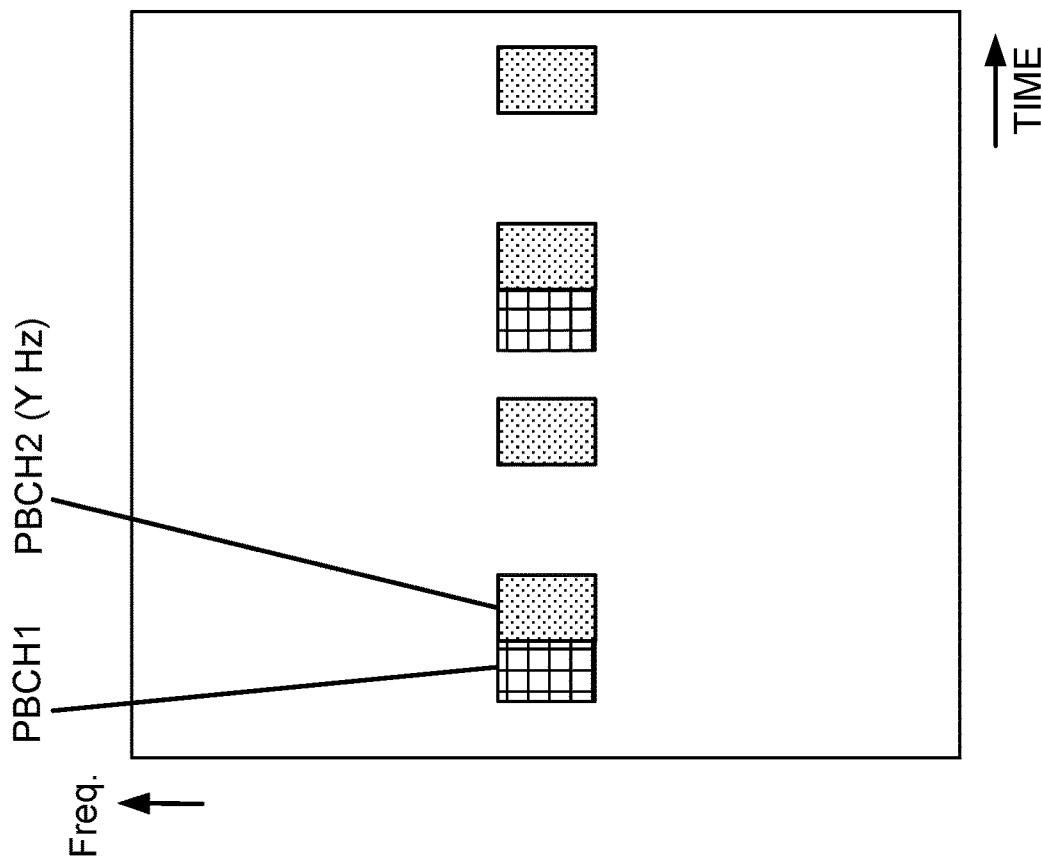
FIGS. 3A and 3B are diagrams illustrating an example of PBCH radio resources according to the second embodiment of the present invention.
Figure 3A:
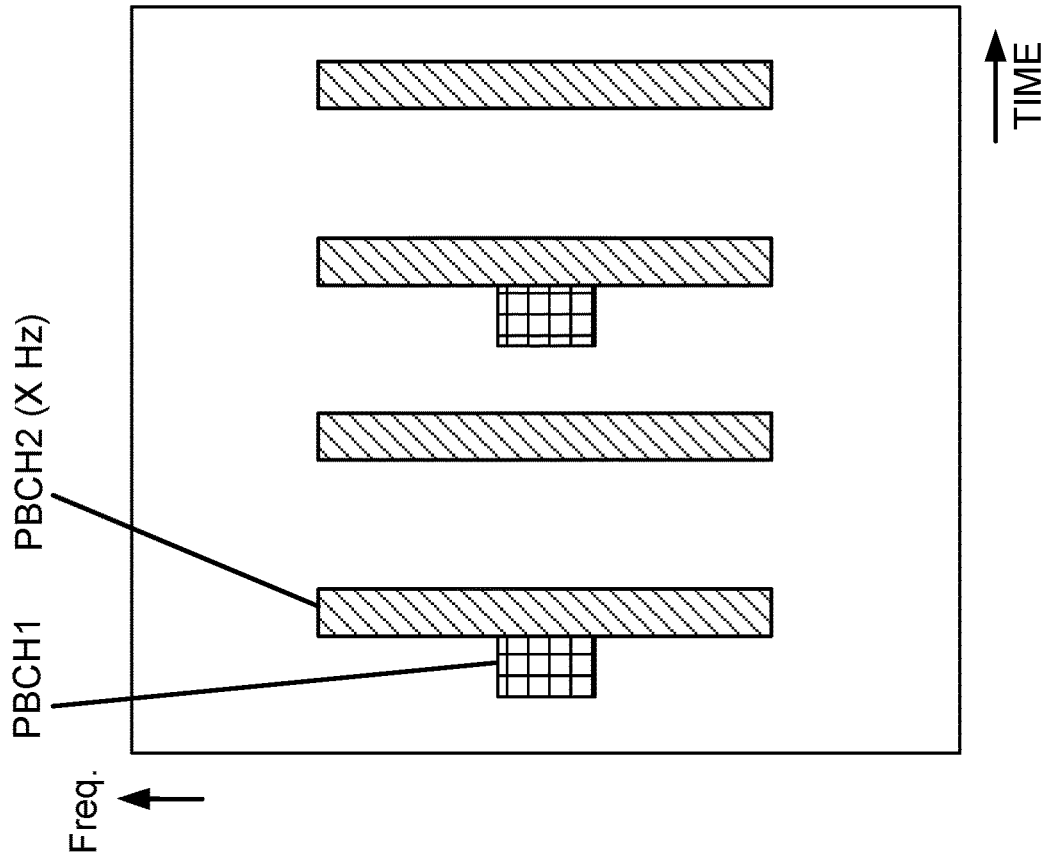

FIG. 3 provides diagrams illustrating an example of a radio resource of PBCH according to the second embodiment of the present invention. FIG. 3A illustrates an example of the PBCH radio resource corresponding to the initial specifications in the above-mentioned scenario. In the case of FIG. 3A, for example, the UE corresponding to the initial specifications is configured to receive information required to receive OBCH 2 by using the PNCH 1 after completion of synchronization, understand that the PBCH 2 is transmitted in the bandwidth of X Hz based on the information and receive the PBCH 2.

On the other hand, FIG. 3B illustrates an example of radio resources corresponding to the latter specifications in the above-mentioned scenario. In the case of FIG. 3B, for example, the UE only supports the bandwidth of maximum Y Hz and receives information required to receive PBCH 2 by using PBCH 1, understands that the PBCH 2 is transmitted in the bandwidth of Y Hz based on the information and receives PBCH 2.

In this way, as the UE is able to specify PBCH 2 based on PBCH 1 that all the terminals in compliance with the specifications are able to receive, irrespective of the maximum bandwidth to support, the UE is able to receive the broadcast information reliably. In addition, when eNB determines that only a UE supporting the latter specifications in the above-mentioned scenario is located in the cell, the eNB only has to transit PBCH 2 of Y Hz like in FIG. 3B and later SIB and the eNB is able to control not to transmit PBCH 2 of X Hz like in FIG. 3A and later SIB that the served UE is not able to receive. Therefore, it is able to reduce communication overhead associated with the broadcast information.

Here, as illustrated in FIG. 3, PBCH 1 and PBCH 2 are preferably transmitted periodically, and this is not intended to limit the present invention. In addition, as illustrated in FIG. 3, PBCH 1 and PBCH 2 may be transmitted at different cycles or may be transmitted at the same cycle. Further, the radio resources to which the PBCH 1 and PBCH 2 are allocated are not limited to those illustrated in FIG. 3. For example, PBCH 2 in the relatively narrow band like in FIG. 3B may be allocated to more time resources as compared with the PBCH 1 and PBCH 2 in the relatively wide band.

Here, UE may use the information required to receive PBCH 2 transmitted by PBCH 1 as information required to receive SIB and/or downlink control channel (for example, PDCCH (Physical Downlink Control channel)) in a common search space (CSS) (such information is, for example, information to specify a radio resource or information of signal/channel format). In addition, PBCH 1 may be used to provide the UE with information required to receive SIB and/or PDCCH in CSS, instead of (or in addition to) the information required to receive the PBCH 2. For example, the PBCH 1 may be used to provide the frequency bandwidth of SIB and/or CSS PDCCH. Here, the information required to receive SIB and/or CSS PDCCH may be provided to the UE by PBCH 2.

Further, when a plurality of numerologies is supported, information about the numerologies may be provided by PBCH 1. In this case, the UE may assume that the received numerologies are used in all channels other than PBCH 1. Here, the UE may assume that the received numerologies are used by a part of channels (for example, PBCH 2) other than PBCH 1.

In addition, information about numerologies may be provided by PBCH 2. In this case, the UE is able to specify a numerology to use in transmission of another signal (channel) to the synchronization signal (PSS/SSS) and the broadcast signal (PBCH) based on the information about the received numerology.

Modified Example of Second Embodiment

In the second embodiment, a plurality of PBCHs are described as being used, but this is not intended to limit the present invention. For example, information required to receive PBCH 2 may not be PBCH 1, but may be determined by UE based on a synchronization signal. In this case, PBCH 1 does not have to be transmitted, and it is possible to reduce communication overhead accordingly. Determination based on the synchronization signal may be performed in the same manner as the determination of numerologies explained in the embodiments 1.1 through 1.3. For example, a radio resource to which PBCH 2 is allocated (for example, frequency resource) may be associated with PSS and/or SSS sequence, or may be provided explicitly by PSS and/or SSS.

In addition, the numerology specified by the synchronization signal may be associated with information required to receive PBCH 2 (for example, PBCH format). This association may be defined in the specifications to be known to UE in advance or information about this association may be provided by using a synchronization signal. Also in this case, PBCH needs not to be transmitted.

Further, UE may detect PBCH 2 directly without detecting PBCH 1. Also in this case, PBCH 1 needs not to be transmitted. Further, UE is configured to know information required to receive each of a plurality of different PBCHs 2. For example, this information may be defined in the specifications. Further, UE tries blind detecting each of different PBCH 2. Here, among the plurality of PBCH 2, one may be a radio resource in the minimum allocation unit (for example, frequency resource in the minimum allocation unit) in the given communication standard (for example, 5G), and another may be a larger radio resource than the radio resource (for example, the larger radio resource is a radio resource of broader bandwidth).

The following description is made about the blind detecting, with reference to FIG. 4. FIG. 4 provides diagrams for explaining a modified example of the second embodiment of the present invention.

Figure 4A:
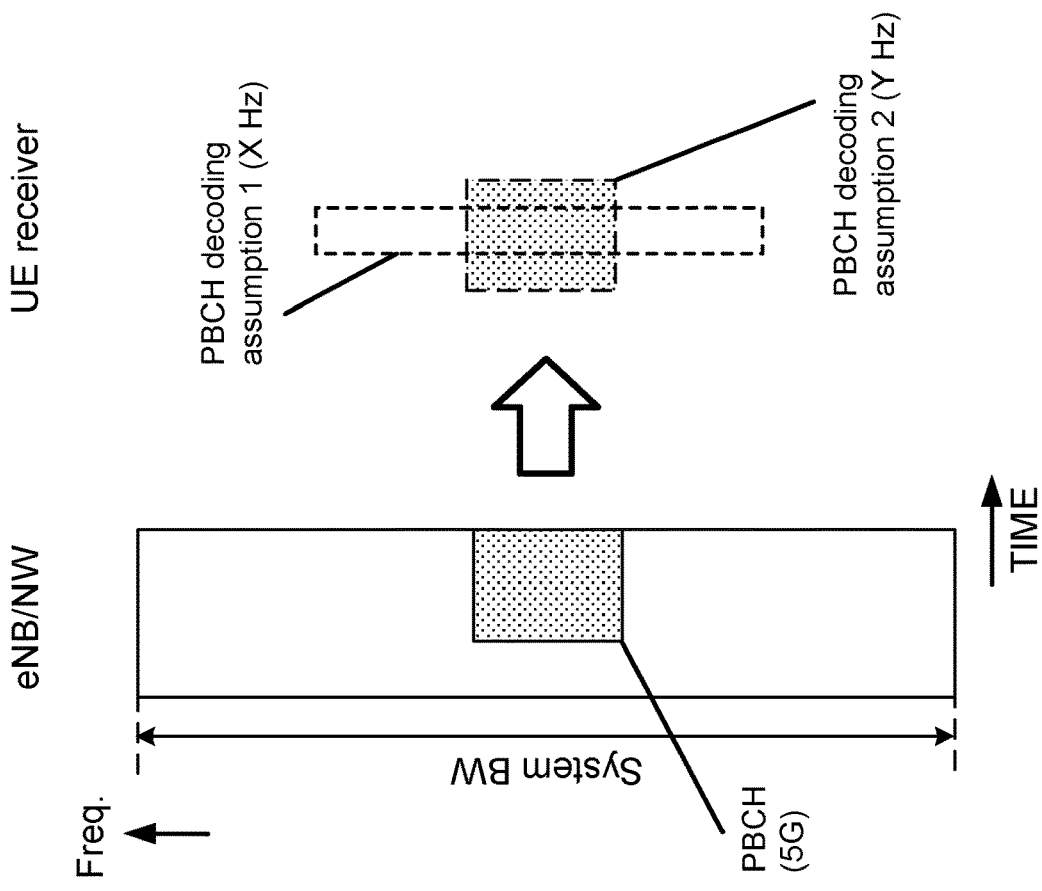
FIGS. 4A and 4B are diagrams for explaining a modified example of the second embodiment of the present invention.
Figure 4B:
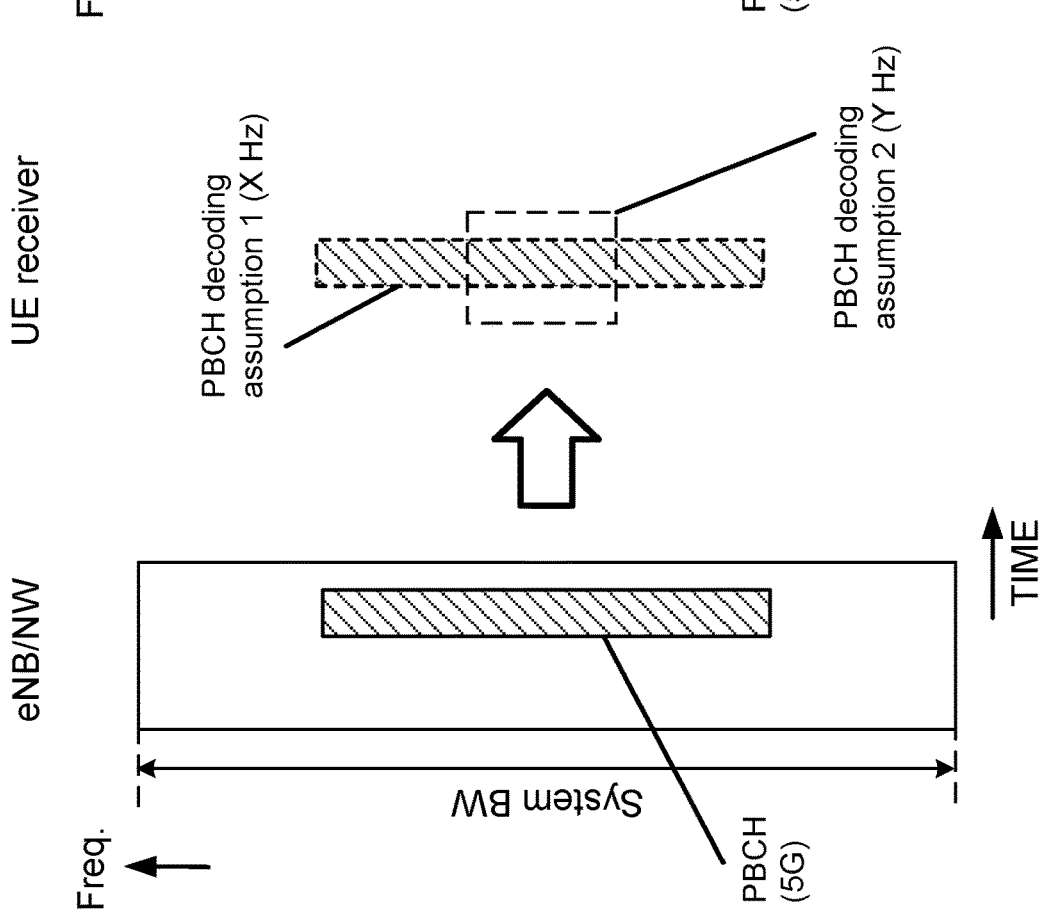

FIG. 4A illustrates an example in which PBCH corresponding to the initial specifications in the scenario described in the second embodiment is transmitted from eNB/NW, and FIG. 4B illustrates an example in which PBCH corresponding to the alter specifications in the scenario is transmitted from eNB/NW. In FIG. 4, a receiver of UE tries blind decoding on the assumption of the former PBCH (PBCH decoding assumption 1) and blind decoding (PBCH decoding assumption 2) on the assumption of the latter PBCH. In any of the FIG. 4A case and FIG. 4B case, UE is able to receive transmitted PBCH.

Thus, according to the configuration in which the UE blind-detects a plurality of PBCHs, for example, if it is determined to use PBCH like in FIG. 4A at the initial stage of development of the specifications and to use PBCH like in FIG. 4B at the latter stage of development of the specifications, it is possible to adopt a system to transmit the PBCH of FIG. 4B without transmitting the PBCH of FIG. 4A, and PBCH transition is allowed accordingly. With this configuration, it is possible to reduce communication overhead associated with the broadcast information.

In each of the above-described embodiments, UE may provide information about a specified numerology to the network side (for example, eNB). In addition, UE may provide eNB with UE capability information (UE Capability) about a handlable numerology. In addition, these notifications may be performed by using any of higher layer signaling (for example, RRC (Radio Resource Control) signaling, MAC (Medium Access Control) signaling), uplink control information (for example, UCI (Uplink Control Information) or combination, dynamically or semi-statically.

Further, the configuration described in each of the embodiments of the present invention may be applied irrespective of the radio access scheme. For example, the present invention is applicable even if a radio access scheme used in downlink (uplink) is OFDMA, SC-FDMA or another radio access scheme. That is, the symbol illustrated in each of the embodiments is not limited to OFDM symbol or SC-FDMA symbol.

Further, the above-described radio communication method is not limited to 5G RAT, but may be applied to another RAT including LTE. In addition, the above-described radio communication method may be applicable to any of PCell (Primary Cell) and SCell (Secondary Cell), or may be applicable to either of them. For example, the above-described radio communication method may be applied only in licensed band (or carrier not configured with listening) or it may be applied only in unlicensed band (carrier not configured with listening).

The above-mentioned radio communication method is applicable not only to the 5G RAT standalone configuration, but also to the case connectable to LTE RAT. For example, UE may specify a given 5G RAT numerology based on a synchronization signal transmitted in LTE RAT.

Further, the second embodiment may be adopted in combination with the first embodiment. For example, UE may be configured to specify a numerology of PBCH 1 based on a synchronization signal and a numerology and/or a bandwidth of PBCH 2 based on PBCH 1.

(Radio Communication System)

The following description concerns the configuration of a radio communication system according to an embodiment of the present invention. This radio communication system is applied with any and/or combination of the radio communication methods according to the embodiments explained above.

Figure 5:
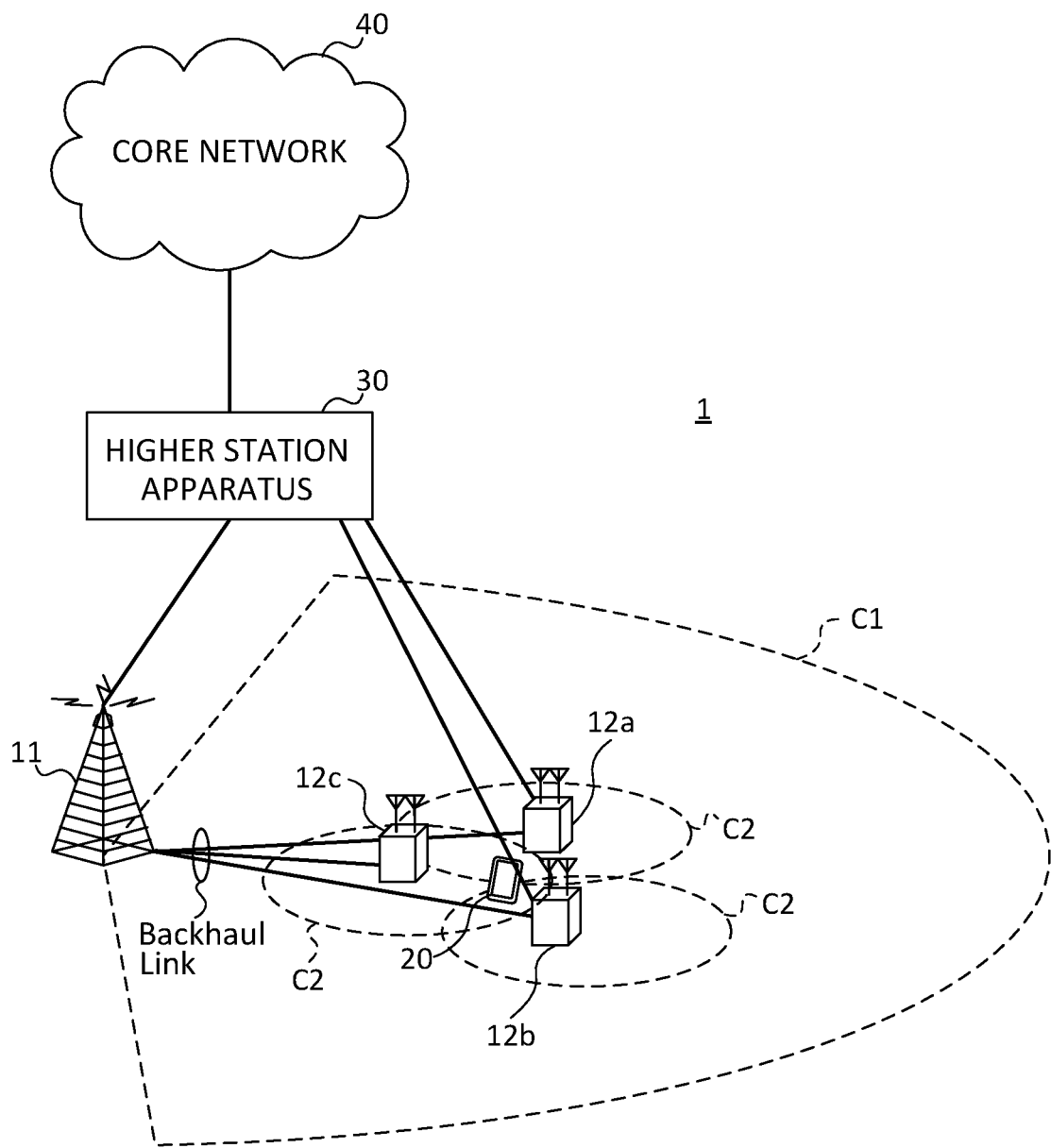
FIG. 5 is a diagram illustrating an example of a schematic configuration of a radio communication system of according to an embodiment of the present invention.

FIG. 5 shows an example of a schematic configuration of the radio communication system according to an embodiment of the present invention. The radio communication system 1 can adopt carrier aggregation (CA) and/or dual connectivity (DC) in which a plurality of fundamental frequency blocks (component carriers) are aggregated and a system bandwidth of the LTE system (for example, 20 MHz) is used as one unit.

Note that this radio communication system 1 may also be called LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New RAT (Radio Access Technology), etc., or may be a system for realizing them.

The radio communication system 1 illustrated in FIG. 5 is configured to include a radio base station 11 forming a macro cell C1 having a relatively wide coverage and radio base stations 12 (12a through 12c) each forming a small cell C2 that is narrower than the macro cell C1. In the macro cell C1 and each small cell C2, a user terminal 20 is located.

The user terminal 20 is able to connect to both of the radio base station 11 and the radio base stations 12. The user terminal 20 is expected to use the macro cell C1 and the small cell C2 simultaneously by CA or DC. In addition, the user terminal may apply CA or DC by using a plurality of cells (CCs) (for example, five CCs or less, six CCs or more).

Communication between the user terminal 20 and the radio base station 11 can be performed by using a carrier of a relatively low frequency band and a narrow bandwidth (also called, existing carrier, Legacy carrier, etc.). On the other hand, communication between the user terminal 20 and the radio base station 12 can be performed by using a carrier of a relatively high frequency band (for example, 3.5 GHz, 5 GHz, etc.) and a wide bandwidth (for example, 5G RAT carrier) or by using the same carrier as that used in the communication between the user terminal 20 and the radio base station 11. Note that the configuration of a frequency band used by each radio base station is not limited to this.

Connection between the radio base station 11 and the radio base station 12 (or between the two radio base stations 12) may be wired connection (for example, optical fiber in compliance with CPRI (Common Public Radio Interface), X2 interface, etc.) or may be wireless connection.

The radio base station 11 and each radio base station 12 are connected to a higher station apparatus 30, and is connected to a core network 40 via the higher station apparatus 30. The higher station apparatus 30 includes, but is not limited to, an access gateway apparatus, a radio network controller (RNC), and a mobility management entity (MME), etc. In addition, each radio base station 12 may be connected to the higher station apparatus 30 via the radio base station 11.

The radio base station 11 is a radio base station having a relatively wide coverage ad may be called macro base station, aggregation node, eNB (eNodeB), transmission/reception point, etc. In addition, the radio base station 12 is a radio base station having a local coverage and may be called small base station, micro base station, pico base station, femto base station, HeNB (Home eNodeB), RRH (Remote Radio Head), transmission/reception point, etc. In the following description, the radio base stations 11 and 12 are each called radio base station 10 collectively, unless they are discriminated from each other.

Each user terminal 20 is a terminal supporting various communication schemes such as LTE and LTE-A or may include not only a mobile communication terminal, but also a fixed communication terminal.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme for performing communication by dividing a frequency band into a plurality of narrow frequency bands (subcarriers) and mapping data to each subcarrier. SC-FDMA is a single carrier transmission scheme to reduce interference between terminals by dividing, per terminal, the system bandwidth into bands formed with one or continuous resource blocks, and allowing a plurality of terminals to use mutually different bands. Note that combination of uplink and downlink radio access schemes is not limited to this.

In the radio communication system 1, used as downlink channels are a downlink shared channel (PDSCH: Physical Downlink Shared Channel) that is used by each user terminal 20 on a shared basis, a broadcast channel (PBCH: Physical Broadcast channel), and a downlink L1/L2 control channel, etc. PDSCH is used to transmit user data and higher layer control information, and an SIB (System Information Block). Furthermore, PBCH is used to transmit an MIB (Master Information Block), etc.

The downlink L1/L2 control channel includes a PDCCH (Physical Downlink Control Channel), an EPDCCH (Enhanced Physical Downlink Control Channel), a PCFICH (Physical Control Format Indicator Channel), and a PHICH (Physical Hybrid-ARQ Indicator Channel), etc. The PDCCH is used to transmit downlink control information (DCI), etc., which includes PDSCH and PUSCH scheduling information. The PCFICH is used to transmit the number of OFDM symbols used in the PDCCH. The PHICH is used to transmit HARQ (Hybrid Automatic Repeat request) retransmission control information for PUSCH (for example, retransmission control information, HARQ-ACK, ACK/NACK, etc.). The EPDCCH is frequency-division-multiplexed with a PDSCH (downlink shared data channel) and is used for transmitting the DCI like the PDCCH.

In the radio communication system 1, used as uplink channels are an uplink shared channel (PUSCH: Physical Uplink Shared Channel) that is used by each user terminal 20 on a shared basis, an uplink control channel (PUCCH: Physical Uplink Control Channel), and a random access channel (PRACH: Physical Random Access Channel), etc. The PUSCH may be called an uplink data channel. The PUSCH is used to transmit user data and higher layer control information. The PUCCH is used to transmit uplink control information (UCI) including at least one of downlink radio quality information (CQI: Channel Quality Indicator), retransmission control information and so on. The PRACH is used to transmit a random access preamble for establishing connection with a cell.

In the radio communication system 1, downlink reference signals as transmitted are a cell-specific reference signal (CRS), a channel state information-reference signal (CSI-RS), a demodulation reference signal (DMRS), a positioning reference signal (PRS) and so on. Further, in the radio communication system 1, uplink reference signals as transmitted are a measurement reference signal (SRS: Sounding Reference Signal), a demodulation reference signal (DMRS) and so on. The DMRS may be also called a user terminal specific reference signal (UE-specific Reference Signal). The reference signals as transmitted are not limited to these signals.

<Radio Base Station>

Figure 6:
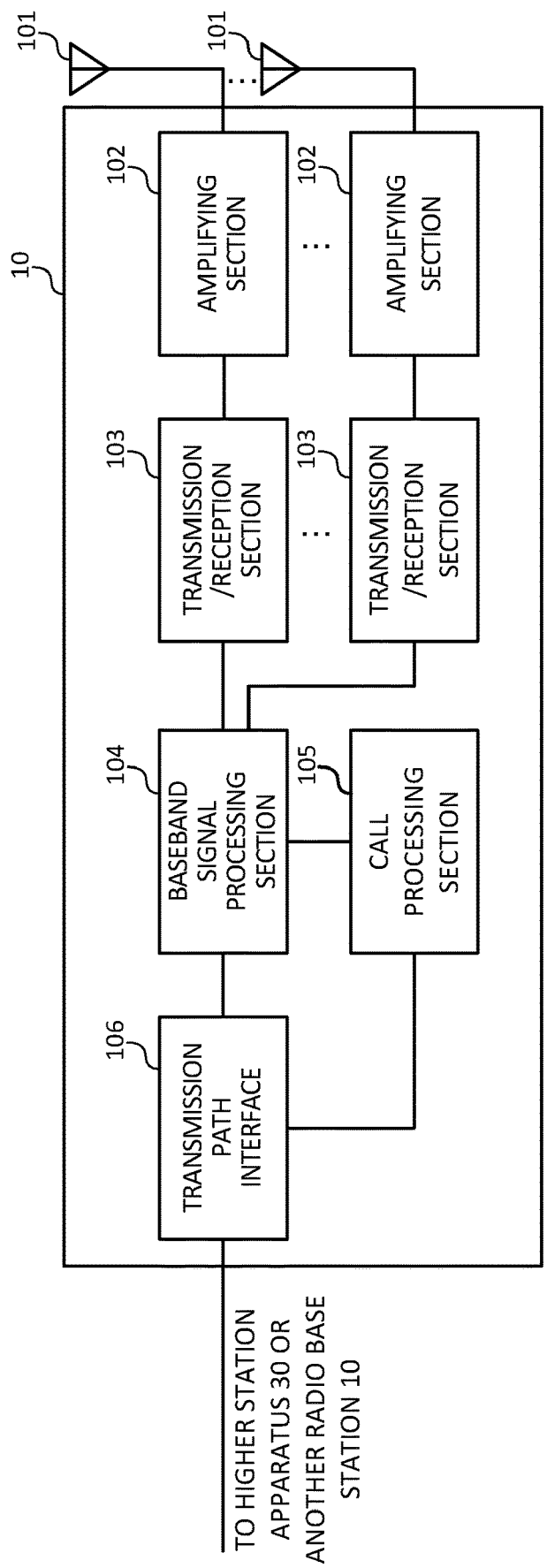
FIG. 6 is a diagram illustrating an overall configuration of a radio base station according to the illustrated embodiment of the present invention.

FIG. 6 is a diagram illustrating an overall configuration of the radio base station according to an embodiment of the present invention. The radio base station 10 is configured to include at least a plurality of transmission/reception antennas 101, amplifying sections 102, transmission/reception sections 103, a baseband signal processing section 104, a call processing section 105 and a transmission path interface 106. The numbers of transmission/reception antennas 101, amplifying sections 102 and transmission/reception sections 103 may be set to one or more.

User data that is to be transmitted on the downlink from the radio base station 10 to the user terminal 20 is input from the higher station apparatus 30, via the transmission path interface 106, into the baseband signal processing section 104.

In the baseband signal processing section 104, in regard to the user data, signals are subjected to PDCP (Packet Data Convergence Protocol) layer processing, RLC (Radio Link Control) layer transmission processing such as division and coupling of user data and RLC retransmission control transmission processing, MAC (Medium Access Control) retransmission control (e.g., HARQ (Hybrid Automatic Repeat reQuest) transmission processing), scheduling, transport format selection, channel coding, inverse fast Fourier transform (IFFT) processing, and precoding processing, and resultant signals are transferred to the transmission/reception sections 103. Furthermore, in regard to downlink control signals, transmission processing is performed, including channel coding and inverse fast Fourier transform, and resultant signals are also transferred to the transmission/reception sections 103.

Each transmission/reception section 103 converts the baseband signals, output from the baseband signal processing section 104 after being precoded per each antenna, to a radio frequency band and transmits this radio frequency band. The radio frequency signals frequency-converted in the transmission/reception section 103 are amplified in the amplifying section 102 and are transmitted from the transmission/reception antenna 101. Note that each transmission/reception section 103 may be configured as a transmitter/receiver, a transmission/reception circuit or a transmission/reception device as explained based on common knowledge in the technical field to which the present invention pertains. The transmission/reception section 103 may be configured of an integral transmission/reception section, or may be configured as a transmission section and a reception section. For example, the transmission/reception section 103 transmits synchronization signals and broadcast signals to the user terminal 20.

Whereas, in regard to the uplink signals, radio frequency signals received by each transmission/reception antenna 101 are amplified by each amplifying section 102. The transmission/reception sections 103 receive the uplink signals that are amplified by the amplifying sections 102, respectively. The transmission/reception sections 103 frequency-convert the received signals into baseband signals and the converted signals are then output to the baseband signal processing section 104.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on user data included in the input uplink signals. The signals are then transferred to the higher station apparatus 30 via the transmission path interface 106. The call processing section 105 performs call processing such as setting up and releasing a communication channel, manages the state of the radio base station 10, and manages the radio resources.

The transmission path interface 106 performs transmission and reception of signals with the higher station apparatus 30 via a predetermined interface. Furthermore, the transmission path interface 106 can perform transmission and reception of signals (backhaul signaling) with another radio base station 10 via an inter-base-station interface (for example, optical fiber or X2 interface compliant with CPRI (Common Public Radio Interface)).

Figure 7:
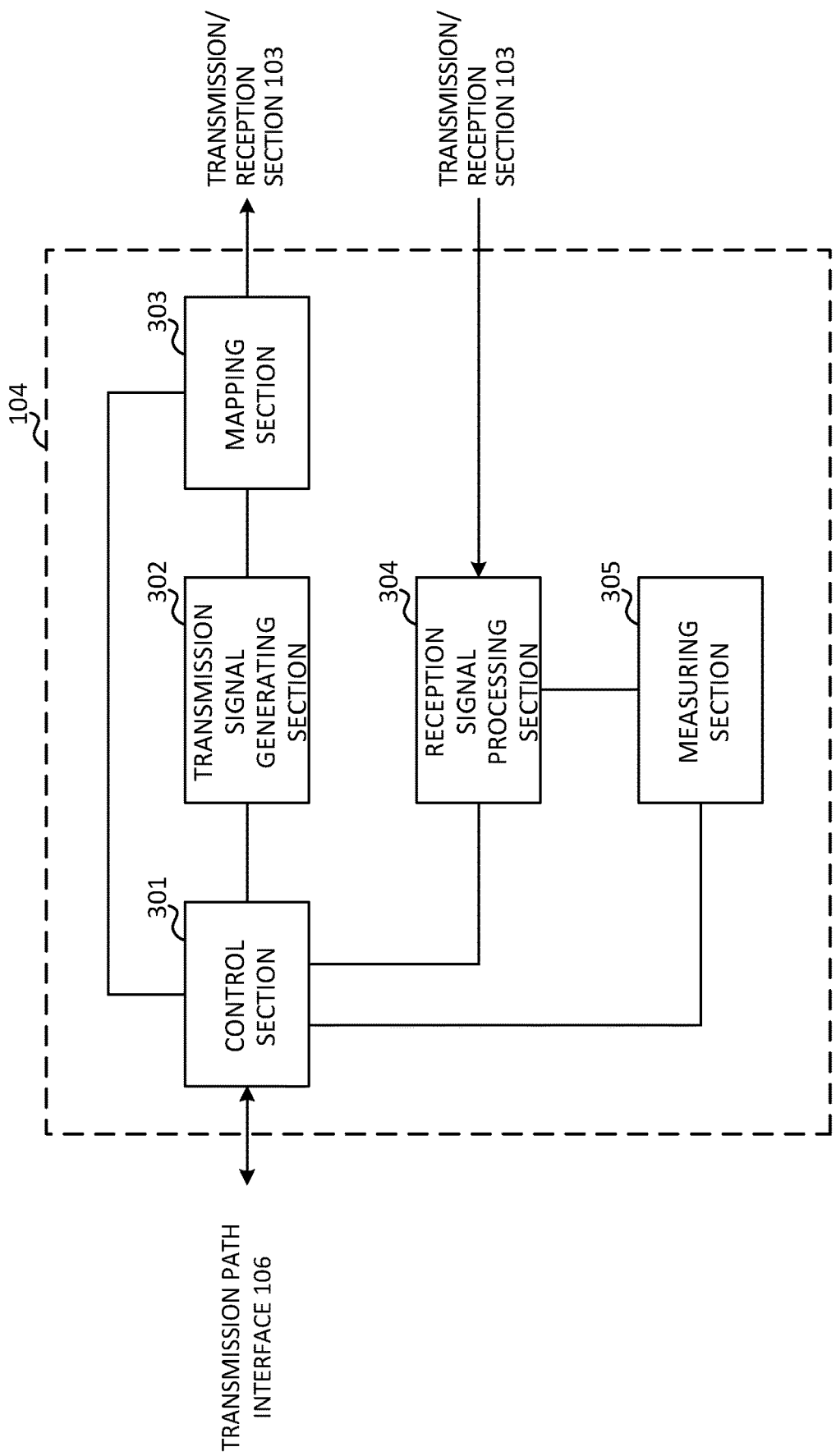
FIG. 7 is a diagram illustrating a functional configuration of the radio base station according to the illustrated embodiment of the present invention.

FIG. 7 is a diagram illustrating the functional configuration of the radio base station according to one embodiment of the present invention. Note that although FIG. 7 mainly shows functional blocks of the features of the present embodiment, the radio base station 10 is also provided with other functional blocks that are necessary for carrying out radio communication. As illustrated in FIG. 7, the baseband signal processing section 104 includes at least a control section 301, a transmission signal generating section 302, a mapping section 303, a reception signal processing section 304 and a measuring section 305.

The control section (scheduler) 301 performs control of the radio base station 10 as a whole. The control section 301 may be configured of a controller, a control circuit or a control device as explained based on the common knowledge in the technical field to which the present invention pertains.

The control section 301 controls, for example, generation of signals by the transmission signal generating section 302 and allocation of signals by the mapping section 303. In addition, the control section 301 controls the reception processing of signals by the reception signal processing section 304 and measurement of signals by the measuring section 305.

The control section 301 controls scheduling of the system information and downlink data signals to be transmitted by PDSCH and downlink control signals to be transmitted by PDCCH and/or EPDCCH (for example, resource allocation). In addition, the control section 301 controls scheduling of downlink reference signals such as synchronization signals (for example, PSS (Primary Synchronization Signal)/SSS (Secondary Synchronization Signal)), CRS, CSI-RS, DMRS and so on.

Further, the control section 301 controls scheduling of uplink data signals to be transmitted by PUSCH, uplink control signals (for example, transmission acknowledgement information) to be transmitted by PUCCH and/or PUSCH, random access preamble to be transmitted by PRACH, uplink reference signals and so on.

Specifically, the control section 301 controls a given user terminal 20 to communicate using a given radio access scheme (for example, LTE RAT or 5G RAT). For example, the control section 301 controls (specifies) numerology to be applied to synchronization signals and/or broadcast signals. Besides, the control section 301 may control numerology to be applied to signals other than the synchronization signals and the broadcast signals.

The control section 301 may control to generate a synchronization signal to be transmitted by the transmission section 103 so that the synchronization signal can be used to specify numerology or a radio resource (for example, frequency resource) to be used for transmission of at least one broadcast signal. For example, the control section 301 decides to associate numerology and/or bandwidth to be used in transmission of a broadcast signal with any or combination of a sequence of a synchronization signal, numerology to be used in transmission of the synchronization signal and information provided by the synchronization signal to generate the synchronization signal.

The control section 301 may control to transmit a synchronization signal and a broadcast signal by using the same numerology. In addition, the control section 301 may control to transmit a signal other than the synchronization signal and at least one broadcast signal by using the numerology to be use in transmission of the given broadcast signal.

Further, the control section 301 may control to transmit information for specifying the numerology to be used in transmission of a signal other than the synchronization signal and at least one broadcast signal, by using a given broadcast signal.

Further, the control section 301 may control to transmit the first broadcast signal by using a predetermined fixed bandwidth. In this case, the control section 301 may control to transmit information to specify numerology and/or a radio resource of a second broadcast signal different from the first broadcast signal by using the first broadcast signal.

The transmission signal generating section 302 generates downlink signals (downlink control signals, downlink data signals, downlink reference signals, etc.) based on an instruction from the control section 301 and outputs them to the mapping section 303. The transmission signal generating section 302 may be configured of a signal generator, a signal generating circuit or a signal generating device as explained based on common knowledge in the technical field to which the present invention pertains.

The transmission signal generating section 302, for example, generates UL grant to provide allocation information of uplink signals and allocation information of downlink signals based on an instruction from the control section 301. The downlink data signals are subjected to the coding processing and modulation processing in accordance with a coding rate and a modulation scheme that are determined based on channel state information (CSI: Channel State Information) and the like from each user terminal 20.

The mapping section 303 maps a downlink signal generated by the transmission signal generating section 302 to a given radio resource based on an instruction from the control section 301 and outputs the signal to the transmission/reception section 103. The mapping section 303 may be configured of a mapper, a mapping circuit or a mapping device as explained based on common knowledge in the technical field to which the present invention pertains.

The reception signal processing section 304 performs reception processing (for example, demapping, demodulation, decoding, etc.) on a reception signal input from the transmission/reception section 103. Here, the reception signal is, for example, an uplink signal (a uplink control signal, an uplink data signal, an uplink reference signal, or the like) transmitted from the user terminal 20. The reception signal processing section 304 may be configured of a signal processor, a signal processing circuit or a signal processing device as explained based on the common knowledge in the technical field to which the present invention pertains.

The reception signal processing section 304 outputs information decoded by the reception processing, to the control section 301. For example, when receiving PUCCH including HARQ-ACK, the reception signal processing section 304 outputs HARQ-ACK to the control section 301. In addition, the reception signal processing section 304 outputs a reception signal and a signal having been subjected to the reception processing, to the measuring section 305.

The measuring section 305 performs measurement about received signals. The measuring section 304 may be configured of a measuring unit, a measuring circuit or a measuring device as explained based on common knowledge in the technical field to which the present invention pertains.

For example, the measuring section 305 may perform measurements of reception power (for example, PSRP (Reference Signal Received Power)) of a received signal, reception signal strength (for example, RSSI (Received Signal Strength Indicator)), reception quality (for example, RSRQ (Reference Signal Received Quality)), channel state and so on. The measurement result may be output to the control section 301.

<User Terminal>

Figure 8:
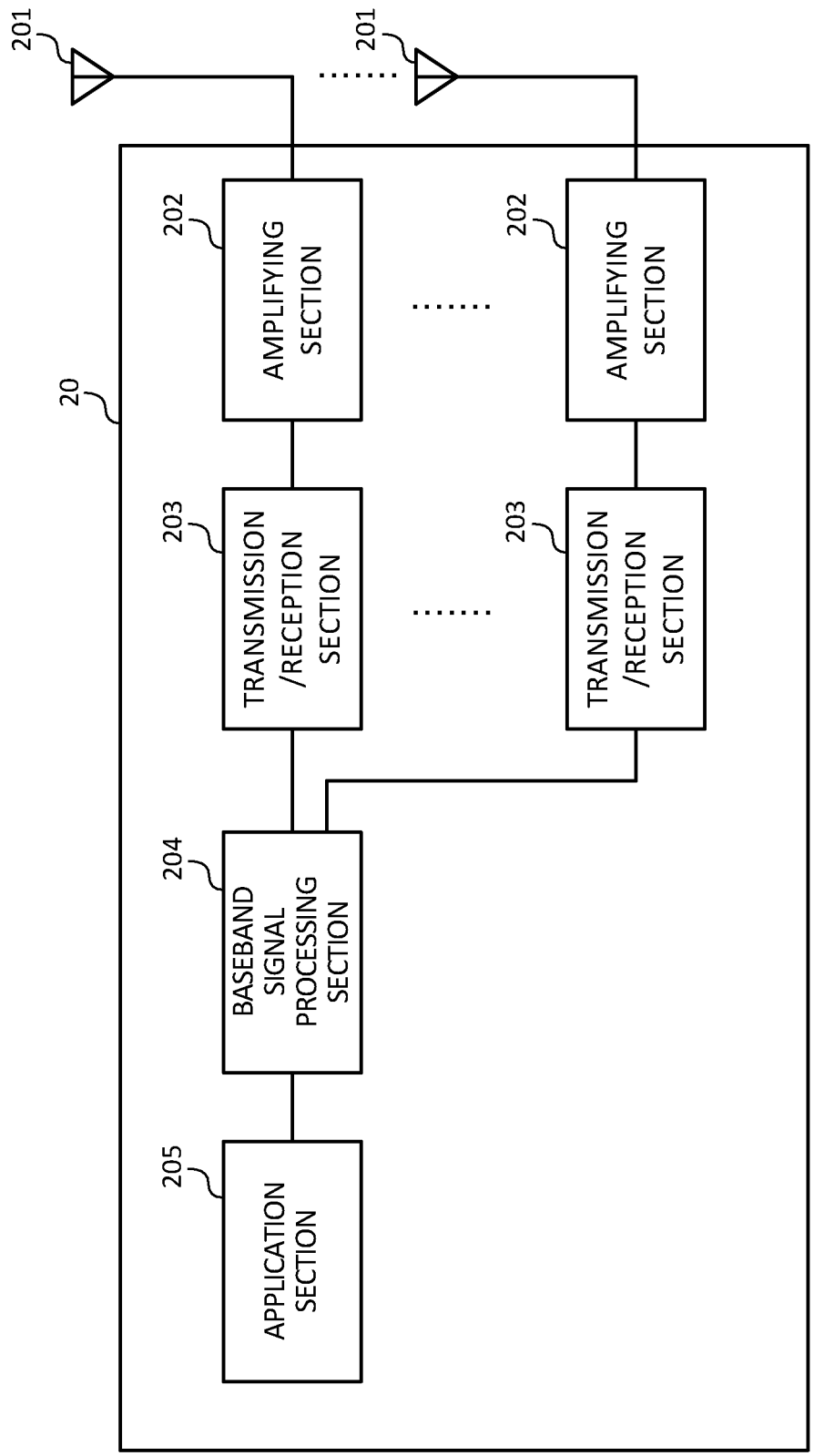
FIG. 8 is a diagram illustrating an overall configuration of a user terminal according to the illustrated embodiment of the present invention.

FIG. 8 is a diagram showing an overall structure of a user terminal according to an embodiment of the present invention. The user terminal 20 is provided at least with a plurality of transmission/reception antennas 201, amplifying sections 202, transmission/reception sections 203, a baseband signal processing section 204 and an application section 205. Besides, the numbers of transmission/reception antennas, amplifying sections and transmission/reception sections may be set to one or more.

Radio frequency signals that are received in the transmission/reception antennas 201 are respectively amplified in the amplifying sections 202. Each transmission/reception section 203 receives a downlink signal (for example, a synchronization signal, a broadcast signal or the like) that has been amplified by an associated amplifying section 202. The transmission/reception sections 203 perform frequency conversion on the reception signals and output the signals to the baseband signal processing section 204. Each transmission/reception 203 may be configured of a transmitter/receiver, a transmission/reception circuit or a transmission/reception device as explained based on the common knowledge in the technical field to which the present invention pertains. The transmission/reception section 203 may be an integral transmission/reception section or may be configured of a transmission section and a reception section.

The input baseband signal is subjected to an FFT process, error correction decoding, a retransmission control receiving process, etc., in the baseband signal processing section 204. The downlink user data is forwarded to the application section 205. The application section 205 performs processes related to higher layers above the physical layer and the MAC layer. Furthermore, out of the downlink data, broadcast information is also forwarded to the application section 205.

On the other hand, uplink user data is input to the baseband signal processing section 204 from the application section 205. In the baseband signal processing section 204, a retransmission control transmission process (for example, HARQ transmission process), channel coding, precoding, a discrete fourier transform (DFT) process, an inverse fast fourier transform (IFFT) process, etc., are performed, and the result is forwarded to each transmission/reception section 203. The transmission/reception section 203 converts a baseband signal output from the baseband signal processing section 204 into a radio frequency band and transmits the resultant signal. The radio frequency signal frequency-converted in the transmission/reception section 203 is amplified by the amplifying section 202 and is transmitted from the transmission/reception antenna 201.

Figure 9:
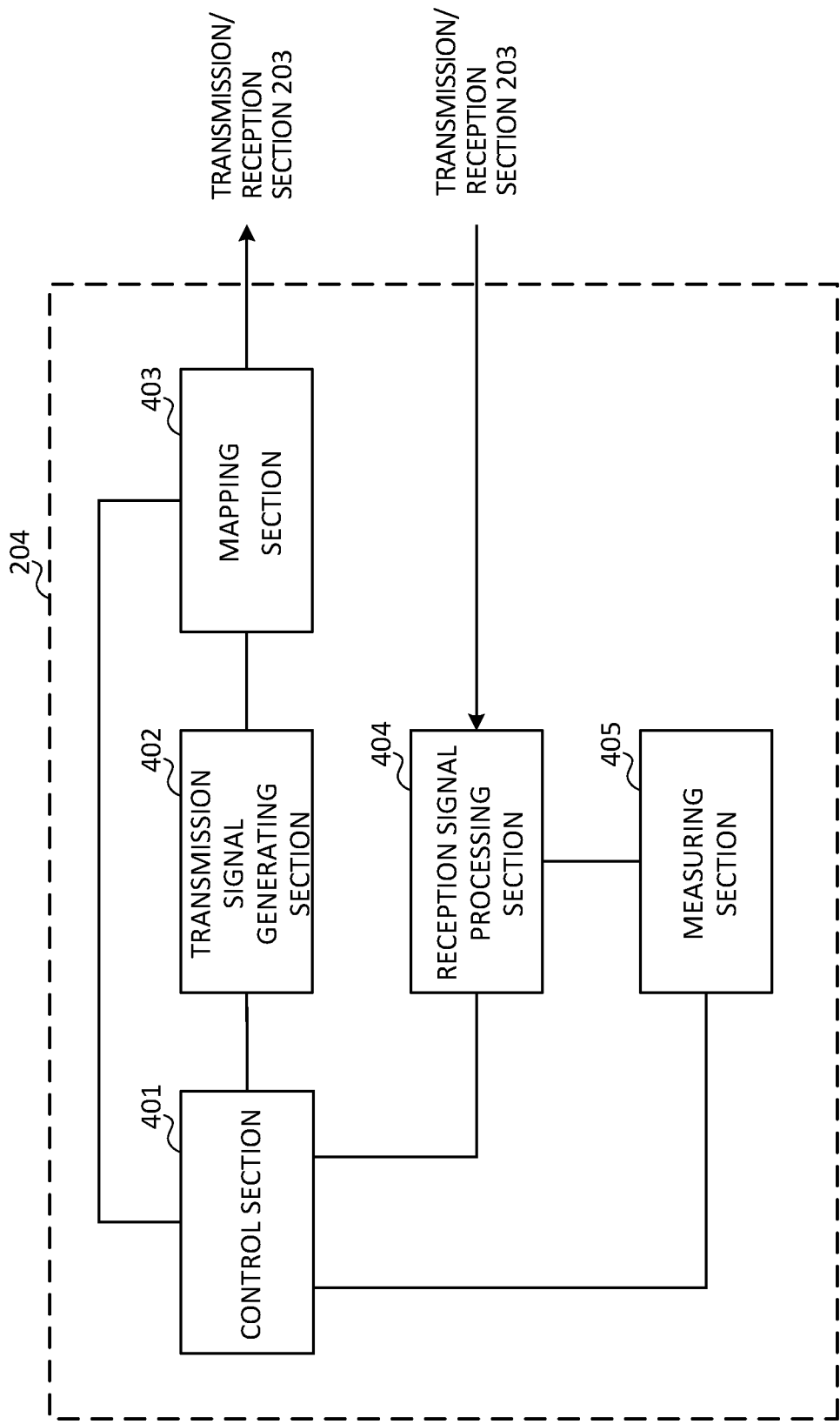
FIG. 9 is a diagram illustrating a functional configuration of the user terminal according to the illustrated embodiment of the present invention.

FIG. 9 is a diagram illustrating the functional configuration of the user terminal according to an embodiment of the present invention. Note that FIG. 9 mainly shows functional blocks of the features of the present embodiment, and the user terminal 20 is also provided with other functional blocks that are necessary for carrying out radio communication. As illustrated in FIG. 9, the baseband signal processing section 204 provided in the user terminal 20 includes a control section 401, a transmission signal generating section 402, a mapping section 403, a reception signal processing section 404 and a measuring section 405.

The control section 401 controls the user terminal 20 as a whole. The control section 401 may be configured of a controller, a control circuit or a control device as explained based on common knowledge in the technical field to which the present invention pertains.

The control section 401 controls, for example, generation of signals by the transmission signal generating section 402 and signal mapping by the mapping section 403. In addition, the control section 401 controls signal reception processing by the reception signal processing section and measurement of signals by the measuring section 405.

The control section 401 obtains, from the reception signal processing section 404, a downlink control signal (signal transmitted by PDCCH/EPDCCH) and a downlink data signal (signal transmitted by PDSCH) transmitted from the radio base station 10. The control section 401 controls generation of an uplink control signal (for example, transmission acknowledgement information or the like) and an uplink data signal based on a result of determining whether or not retransmission control is required for a downlink control signal and a downlink data signal.

Specifically, the control section 401 controls the user terminal 20 to perform communications using a given radio access scheme (for example, LTE RAT or 5G RAT). The control section 401 specifies numerology to be applied to a given signal and controls to receive the given signal in accordance with the numerology.

The control section 401 may specify a communication parameter (numerology) of a radio access scheme to be used in transmission of at least one broadcast signal and/or a radio resource (for example, frequency resource) to be used in transmission of the broadcast signal.

For example, the control section 401 specifies the numerology and/or the frequency resource to be used for PBCH transmission based on any or combination of a sequence of a synchronization signal, numerology to be used for transmission of a synchronization signal and information to be provided by the synchronization signal. The control section 401 may specify PDCH format based on the synchronization signal.

In addition, the control section 401 may identify the numerology to be used for transmission of a given broadcast signal as the numerology to be used for transmission of a signal other than the at least one broadcast signal.

Further, the control section 401 may specify numerology to be used for transmission of a signal other than the synchronization signal and the at least one broadcast signal based on information provided (transmitted) by the given broadcast signal.

Note that if broadcast signals as defined include a first broadcast signal (first broadcast channel) to be transmitted in a predetermined fixed bandwidth and a second broadcast signal (second broadcast channel) to specify a radio resource based on a signal (information) transmitted from the radio base station 10, the control section 401 may specify a numerology and/or a bandwidth of the second broadcast signal based on information given by the first broadcast signal.

In addition, the control section 401 may control the reception signal processing section 403 to blind-decode a plurality of broadcast signals. For example, the control section 401 may control to blind-decode broadcast signals that are transmitted from in a bandwidth of the minimum allocation unit in the given communication standards and broadcast signals that are transmission in a larger bandwidth than the frequency bandwidth.

The transmission signal generating section 402 generates uplink signals (uplink control signals, uplink data signals, uplink reference signals, and so on) based on an instruction from the control section 401 and outputs the signals to the mapping section 403. The transmission signal generating section 402 may be configured of a signal generator, a signal generating circuit or a signal generating device as explained based on common knowledge in the technical field to which the present invention pertains.

For example, the transmission signal generating section 402 generates an uplink control signal related to transmission acknowledgement information and channel state information (CSI) based on an instruction from the control section 401. Besides, the transmission signal generating section 402 generates an uplink data signal based on an instruction from the control section 401. For example, when receiving, from the radio base station 10, a downlink control signal including UL grant, the transmission signal generating section 402 is instructed to generate an uplink data signal by the control section 401.

The mapping section 403 maps the UL signal generated by the transmission signal generating section 402, based on an instruction from the control section 401, to a radio resource and outputs the generated signal to the transmission/reception section 203. The mapping section 403 may be configured of a mapper, a mapping circuit or a mapping device as explained based on the common knowledge in the technical field to which the present invention pertains.

The reception signal processing section 404 performs reception processing (e.g., demapping, demodulation, decoding, etc.) on a reception signal input from the transmission/reception section 203. Note that the reception signal is a downlink signal (a downlink control signal, a downlink data signal, a downlink reference signal, etc.) transmitted from the radio base station 10. The reception signal processing section 404 may be configured of a signal processor, a signal processing circuit or a signal processing device as explained based on the common knowledge in the technical field to which the present invention pertains. In addition, the reception signal processing section 404 may constitute a reception section according to the present invention.

The reception signal processing section 404 outputs information decoded by the reception processing to the control section 401. The reception signal processing section 404, for example, outputs broadcast information, system information, RRC signaling, DCI, etc. to the control section 401. In addition, the reception signal processing section 404 outputs a reception signal and a signal having been subjected to the reception processing, to the measuring section 405.

The measuring section 405 performs measurement about a received signal. The measuring section 405 may be configured of a measuring unit, a measuring circuit or a measuring device as explained based on common knowledge in the technical field to which the present invention pertains.

The measuring section 405 may, for example, measure reception power (for example, RSRP), reception signal strength (for example, RSSI), reception quality (for example, RSRQ), a channel state of the received signal or the like. The measurement result may be output to the control section 401.

(Hardware Configuration)

Furthermore, the block diagrams used in the above description of the present embodiments indicate function-based blocks. These functional blocks (configured sections) are implemented via any combination of hardware and/or software. Furthermore, the implementation of each functional block is not limited to a particular means. In other words, each functional block may be implemented by a single device that is physically connected, or implemented by two or more separate devices connected by a fixed line or wirelessly connected.

Figure 10:
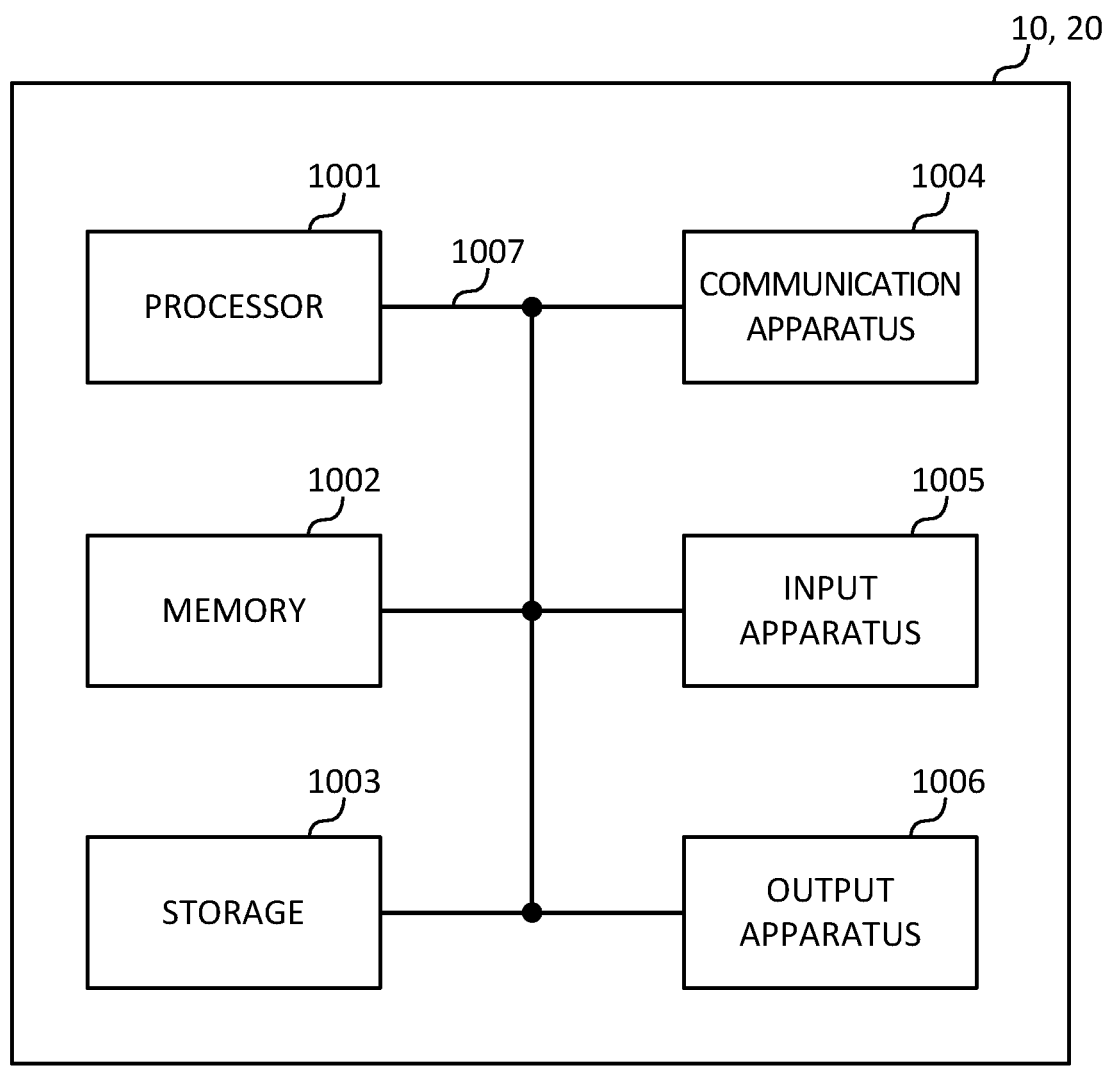
FIG. 10 is a diagram illustrating the hardware configuration of the radio base station and the user terminal according to the illustrated embodiment.

For example, the radio base station and the user terminal according to an embodiment of the present invention may function as a computer that performs processing of the radio communication method of the present invention. FIG. 10 is a diagram illustrating an example of the hardware configuration of the radio base station and the user terminal according to an embodiment of the present invention. The above-described radio base station 10 and user terminal 20 may be configured physically of a computer device including a processor 1001, a memory 1002, a storage 1003, a communication apparatus 1004, an input apparatus 1005, an output apparatus 1006, a bus 1007 and so on.

Note that in the following description, the term "apparatus" may be replaced with a circuit, a device, a unit or the like. The hardware configuration of the user terminal 20 and the radio base station 10 may be configured to include one or a plurality of apparatuses illustrated in the drawings or may be configured not including a part of the apparatuses.

Each function in the radio base station 10 and the user terminal 20 is realized by reading given software (program) to hardware of the processor 1001, the memory 1002 or the like, operating by the processor 1001, and controlling communication by the communication apparatus 1004 and data reading and/or writing in the memory 1002 and storage 1002.

For example, the processor 1001 controls the computer as a whole by operating an operating system. The processor 1001 may be configured of a central processing unit (CPU) including a register, an operating apparatus, a control apparatus, interface with a peripheral device and the like. For example, the above-mentioned baseband signal processing section 104 (204) and call processing section 105, etc. may be implemented by the processor 1001.

Further, the processor 1001 reads programs (program codes), software module and data from the storage 1003 and/or communication apparatus 1004 to the memory 1002 and uses this as a basis to execute various processing. The programs include programs to make the computer operate at least a part of the operations explained in the embodiments above. For example, the control section 401 of the user terminal 20 is stored in the memory 1002 and may be realized by a control program operating in the processor 1001 and other functional blocks may be also implemented in the same manner.

The memory 1002 is a computer readable recoding medium, and, for example, may be configured of at least one of ROM (Read Only Memory), EPROM (Erasable Programmable ROM), RAM (Random Access Memory) and so on. The memory 1002 may be called a resister, cache, main memory (main storage device) or the like. The memory 1002 may hold executable programs (program code), software module and so on to implement the radio communication method according to an embodiment of the present invention.

The storage 1003 is a computer readable storage medium and may be configured of at least one of an optical disk such as CD-ROM (Compact Disc ROM), hard disk drive, flexible disk, magnetic optical disk, flash memory and the like. The storage 1003 may be called auxiliary storage device.

The communication apparatus 1004 is hardware (transmission/reception device) for performing communication between computers via wire and/or wireless network and may be called network device, network controller, network card, communication module or the like. For example, the above-mentioned transmission/reception antennas 101 (201), amplifying sections 102(202), transmission/reception sections 103(203), transmission path interface 106 and so on may be configured in the communication apparatus 1004.

The input apparatus 1005 is an input device receiving an input from the outside (for example, keyboard, mouse, etc.). The output device 1006 is an output device (for example, display, speaker, etc.) for executing output to the outside. The input apparatus 1005 and output apparatus 1006 may be configured integrally (for example, touch panel).

Further, various apparatuses including the processor 1001 and the memory 1002 are connected by a bus 1007 for information communication. The bus 1007 may be configured of a single bus or buses that are different between apparatuses.

In addition, the radio base station 10 and the user terminal 20 may be configured to include hardware such as a micro processor, a digital signal processor 'DSP), ASIC (Application Specific Integrated Circuit), PLD (Programmable Logic Device), and FPGA (Field Programmable Gate Array), or the hardware may be used to realize a part or all of the functional blocks. For example, the processor 1001 may be implemented by at least one of these hardware units.

Note that technical terms discussed in the present specification and/or technical terms necessary for understanding the present specification may be replaced with technical terms having the same or similar meaning. For example, channel and/or symbol may be signals (signaling). Furthermore, a signal may be a message. Furthermore, component carrier (CC) may be called a cell, frequency carrier or a carrier frequency, etc.

The radio frame may be configured of one or a plurality of time period (frames) in the time domain. The one or plural time periods (frames) each constitutes a radio frame and may be called a subframe. Further, the subframe may be configured of one or a plurality of slots in the time domain.

Further, the slot may be configured of one or a plurality of symbols (OFDM symbols, SC-FDMA symbols, etc.) in the time domain.

The radio frame, subframe, slot and symbol each represent a time unit for signal transmission. The radio frame, subframe, slot and symbol may be called different names, respectively. For example, one subframe may be a transmission time interval (TTI), or continuous subframes may be called TTI, or one slot may be called TTI. That is, the subframe and TTI may be a subframe (1 ms) in the existing LTE, may be shorter than 1 ms (for example, 1-13 symbols) or may be longer than 1 ms.

Here, TTI denotes the minimum time unit for scheduling in radio communication. For example, the scheduling in the LTE system is such that a radio base station allocates to each user terminal radio resources (such as frequency bandwidth and transmission power available for each user terminal) on a TTI basis. The definition of TTI is not limited to this.

TTI having a time length of 1 ms may be called normal TTI (TTI in LTE Rel. 8-12), long TTI, normal subframe, 1 ng subframe or the like. TTI that is shorter than the normal TTI may be called shortened TTI, short TTI, shorter TTI, shortened subframe, short subframe, shorter subframe or the like.

Resource block (RB) is a resource allocation unit in the time domain and frequency domain and may include one or a plurality of continuous subcarriers in the frequency domain. Besides, RB may include one or a plurality of symbols in the time domain and may be one slot, one subframe or one TTI length. One TTI and one subframe may be configured of one or a plurality of resource blocks. RB may be called physical resource block (PRB: Physical RB), PRB pair, RB pair or the like.

Further, resource block may be configured of one or a plurality of resource elements (REs). For example, one RE may be a radio resource area of one subcarrier and one symbol.

The above-described configuration of a radio frame, a subframe, a slot and a symbol is merely given by way of example. For example, the number of subframes included in a radio frame, the number of slots included in a subframe, the numbers of symbols and RBs included in a slot, the number of subcarriers included in an RB, the number of symbols in TTI, the symbol length, cyclic prefix (CP) length may be modified variously and appropriately.

Furthermore, information and parameters, etc., discussed in the present specification may be expressed as absolute values, or as a relative value with respect to a predetermined value, or expressed as other corresponding information. For example, a radio resource may be indicated as a given index.

Information and signals, etc., discussed in the present specification may be expressed using any one of various different technologies. For example, data, instructions, commands, information, signals, bits, symbols, chips, etc., that could be referred to throughout the above description may be expressed as voltage, current, electromagnetic waves, a magnetic field or magnetic particles, optical field or photons, or a desired combination thereof.

Furthermore, software, instructions, information and so on may be transmitted and received via a transmission medium. For example, when software is transmitted from a website, server or another remote source by using wired technology (coaxial cable, optical fiber cable, twist pair and digital subscriber line (DSL), etc.) and/or wireless technology (infra-red radiation, micro wave, etc.), these wired and/or wireless technologies are included in the definition of the transmission medium.

The radio base station in the present description may be replaced with and read as a user terminal. For example, assume that communication between the radio base station and the user terminal is replaced with communication between a plurality of user terminals (D2D: Device-to-Device). The above-mentioned embodiments and aspects may be applied to such a configuration. In this case, the above-mentioned functions provided in the radio base station 10 may be configured to be provided in the user terminal 20. In addition, the terms "uplink" and "downlink" may be replaced with "sides". For example, the uplink channel may be replaced with and read as a side channel.

Likewise, the user terminal in the present description may be replaced with and read as the radio base station. In this case, the above-mentioned functions provided in the user terminal 20 may be configured to be provided in the radio base station 10.

The above-described aspects/embodiments of the present invention may be used independently, used in combination, or may be used by switching therebetween when being implemented. Furthermore, notification of predetermined information (e.g., notification of "is X") does not need to be explicit, but may be implicitly (e.g., by not notifying the predetermined information) carried out.

Notification of information is not limited to the aspects/embodiments of the present invention, and such notification may be carried out via a different method. For example, notification of information may be implemented by physical layer signaling (e.g., DCI (Downlink Control Information), UCI (Uplink Control Information)), higher layer signaling (e.g., RRC (Radio Resource Control) signaling, broadcast information (MIB (Master Information Block), SIB (System Information Block)) MAC (Medium Access Control) signaling,), by other signals or a combination thereof. Furthermore, RRC signaling may be called a "RRC message" and may be, e.g., an RRC connection setup (RRCConnectionSetup) message, or an RRC connection reconfiguration (RRCConnectionReconfiguration) message, etc. The MAC signaling may be, for example, given by MAC control element (MAC CE).

The above-described aspects/embodiments of the present invention may be applied to a system that utilizes LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), or other suitable systems and/or to an enhanced next-generation system that is based on any of these systems.

The order of processes, sequences and flowcharts, etc., in the above-described aspects/embodiments of the present invention can have a switched order so long as no contradictions occur. For example, each method described in the present specification proposes an example of an order of various steps but are not limited to the specified order thereof.

Up to this point, the present invention has been described in detail, however, it would be apparent for a person of ordinary skill in the art that the present invention is not limited to the embodiments described herein. For example, the above-described embodiments may be adopted alone or in combination. The present invention can be embodied in various modified or altered forms without departing from the sprit or scope of the present invention defined by claims. Accordingly, the description is given only for illustrative purposes and is by no means intended to limit the present invention.

The disclosure of Japanese Patent Application No. 2016-006548, filed on Jan. 15, 2016, including the specification, drawings, and abstract, is incorporated herein by reference in its entirety.

The invention claimed is:

1. A terminal comprising:
   a receiver that receives a synchronization signal and a broadcast channel; and
   a processor that assumes a same numerology for the synchronization signal as a numerology for the broadcast channel when a plurality of numerologies are supported,
   wherein the processor identifies a numerology for a signal other than the synchronization signal and the broadcast channel based on information on a numerology notified by the broadcast channel.

2. The terminal according to claim 1, wherein each numerology comprises at least one of a subcarrier spacing and a cyclic prefix (CP) length.

3. The terminal according to claim 1, wherein the processor identifies a numerology for a system information block based on the information on the numerology notified by the broadcast channel.

4. The terminal according to claim 3, wherein the processor identifies a numerology for a common search space for downlink control channel based on information on the numerology notified by the broadcast channel.

5. The terminal according to claim 1, wherein the processor identifies a numerology for a common search space for downlink control channel based on information on the numerology notified by the broadcast channel.

6. A radio communication method for a terminal, comprising:
   receiving a synchronization signal and a broadcast channel; and
   assuming a same numerology for the synchronization signal as for the broadcast channel when a plurality of numerologies are supported,
   wherein a numerology is identified for a signal other than the synchronization signal and the broadcast channel based on information on a numerology notified by the broadcast channel.

* * * * *